US012564935B2

(12) United States Patent
Labadie et al.

(10) Patent No.: US 12,564,935 B2
(45) Date of Patent: Mar. 3, 2026

(54) CORDLESS DRIVER HOLDER DEVICE

(71) Applicants: Rosemarie Labadie, Crestline, CA (US); Dennis Labadie, Crestline, CA (US)

(72) Inventors: Rosemarie Labadie, Crestline, CA (US); Dennis Labadie, Crestline, CA (US)

( * ) Notice: Subject to any disclaimer, the term of this patent is extended or adjusted under 35 U.S.C. 154(b) by 40 days.

(21) Appl. No.: 18/655,730

(22) Filed: May 6, 2024

(65) Prior Publication Data

US 2025/0178182 A1 Jun. 5, 2025

Related U.S. Application Data

(60) Provisional application No. 63/606,157, filed on Dec. 5, 2023.

(51) Int. Cl.
*B25H 3/00* (2006.01)
*A45F 5/00* (2006.01)
*A45F 5/02* (2006.01)

(52) U.S. Cl.
CPC ............. *B25H 3/006* (2013.01); *A45F 5/021* (2013.01); *A45F 5/1575* (2025.01)

(58) Field of Classification Search
CPC ........ A45F 5/1575; A45F 5/021; B25H 3/006
USPC ..................................... D8/27; 224/269, 904
See application file for complete search history.

(56) References Cited

U.S. PATENT DOCUMENTS

D215,537 S * 10/1969 Cocks .............................. D8/27
4,214,688 A * 7/1980 Griffin, Jr. ................ A45F 5/00 362/396
4,738,169 A * 4/1988 Wyka ...................... B25B 13/04 81/492
4,754,528 A * 7/1988 Lyons ..................... A45F 5/021 24/3.12
4,773,549 A * 9/1988 Avraham ........... A47G 23/0241 215/396
5,341,975 A * 8/1994 Marinescu ................ A45F 5/02 224/684
5,448,932 A * 9/1995 Zurbuchen ............... B25G 1/12 81/900
5,501,382 A 3/1996 Webb
5,954,247 A * 9/1999 Savine ...................... A45F 5/00 224/601
D423,774 S * 5/2000 Peterson ........................ D3/229
(Continued)

*Primary Examiner* — Justin M Larson

(74) *Attorney, Agent, or Firm* — Brennan, Manna & Diamond, LLC

(57) ABSTRACT

A cordless tool holding device designed to hold battery-operated drills and impact drivers is disclosed. The device features a longitudinal, ergonomically designed handle, suitable for a firm grip. A C-shaped holding member is integrated to the top end of the handle and is adapted to accommodate different sizes and shapes of tool handles. The device also includes a belt clip for easy attachment to a tool pouch and clothing, thereby enhancing portability and accessibility. In one embodiment, the handle incorporates an LED light, providing illumination, thereby improving visibility and precision in work areas. Additionally, the handle can have a hollow design for offering a storage space for bits or screws. The device can be stored in any tool pouch with an accommodating drill to prevent the drill from falling out of the tool pouch while bending over, climbing a ladder, working on a roof, and more.

4 Claims, 6 Drawing Sheets

(56) References Cited

U.S. PATENT DOCUMENTS

| | | | | |
|---|---|---|---|---|
| D460,669 | S * | 7/2002 | Cizek | D9/443 |
| 6,435,389 | B1 | 8/2002 | Sucher | |
| D464,239 | S * | 10/2002 | Hamlin | D8/27 |
| 6,655,560 | B2 * | 12/2003 | Kahn | A45F 5/02 224/904 |
| 6,701,534 | B2 | 3/2004 | Guibord | |
| 6,732,891 | B2 * | 5/2004 | Locklear, III | F41C 33/0272 224/244 |
| D498,357 | S * | 11/2004 | Smith | D3/229 |
| 6,994,238 | B2 * | 2/2006 | Estabaya | A45F 5/02 224/904 |
| D552,345 | S * | 10/2007 | Albert | D3/228 |
| D608,086 | S * | 1/2010 | Johnson | D3/228 |
| 7,686,196 | B2 | 3/2010 | Panosian | |
| D650,644 | S * | 12/2011 | Dosch | D8/21 |
| D662,383 | S * | 6/2012 | Cizek | D8/40 |
| 8,387,840 | B1 * | 3/2013 | Selsor | B23P 11/00 224/904 |
| 8,720,756 | B2 * | 5/2014 | Parsons | A45F 5/02 248/692 |
| 8,777,170 | B2 * | 7/2014 | Gilbert | A47F 7/00 24/3.12 |
| 8,839,546 | B2 * | 9/2014 | Taylor | F41C 33/007 42/107 |
| 9,072,364 | B2 * | 7/2015 | Johnson | F16M 13/027 |
| 9,463,662 | B1 * | 10/2016 | Sotolongo | A45F 5/021 |
| 9,541,244 | B1 * | 1/2017 | Berezinski | F21V 21/0965 |
| 9,713,374 | B1 * | 7/2017 | Page | B44D 3/126 |
| D803,552 | S * | 11/2017 | Stoops | D3/218 |
| 10,925,383 | B2 * | 2/2021 | Murakami | A45D 40/00 |
| 11,369,184 | B1 * | 6/2022 | Hooper | B44D 3/24 |
| 11,805,890 | B1 * | 11/2023 | Mandeville | A45F 5/022 |
| 2002/0113107 | A1 | 8/2002 | Hartranft | |
| 2010/0018355 | A1 * | 1/2010 | Crawford | B25B 13/56 81/488 |
| 2023/0159226 | A1 | 5/2023 | Woolery | |
| 2025/0178182 | A1 * | 6/2025 | Labadie | B25H 3/006 |

* cited by examiner

CORDLESS DRIVER HOLDER DEVICE

CROSS-REFERENCE TO RELATED APPLICATION

The present application claims priority to, and the benefit of, U.S. Provisional Application No. 63/606,157, which was filed on Dec. 5, 2023, and is incorporated herein by reference in its entirety.

FIELD OF THE INVENTION

The present invention generally relates to the field of cordless drills and impact drivers. More specifically, the present invention relates to a novel device for holding a battery-operated drill or impact driver in a tool pouch. The device has a C-shaped top for accommodating the handle of a tool and a belt clip on the handle for clipping the device to a pouch or to clothing. The C-shaped top cradles the tool handle and prevents the tool from falling out of the tool pouch. Accordingly, the present disclosure makes specific reference thereto. Nonetheless, it is to be appreciated that aspects of the present invention are also equally applicable to other like applications, devices, and methods of manufacture.

BACKGROUND

By way of background, drills, and impact driver tools are commonly used by operators for tasks in carpentry, construction, furniture assembly, home repairs, and many other fields. Such tools are portable and offer a wide range of functions, from drilling holes into various materials to driving screws and fasteners of different sizes and shapes. Drills with different driver modes such as drilling, hammer drilling, and driving give flexibility and precision, while impact drivers deliver high torque for driving larger screws or working with dense materials. Further, cordless drills and impact drivers are highly portable and can be easily operated in tight spaces or at different heights.

Commonly, such tools are stored in tool pouches for easy storage and portability. However, cordless drills and impact driver tools have heavy batteries on their rear end causing uneven weight distribution which makes the tools prone to falling out of pouches during activities like bending over or climbing ladders. Accordingly, the body, battery, and other internal components of such tools can crack or break when landed on a hard surface from a pouch. Repeated falls can cause wear and tear of the tool, leading to malfunctioning over time.

When the pouch is placed or taken to a point at elevation such as on a ladder or on a roof, falling tools commonly injure the user or anyone below, especially when the tool lands on heads or feet. Damaged tools also become unsafe to use due to electrical malfunctions or mechanical breakage. Repeated falling of heavy cordless tools also causes inconvenience and loss of productivity as operators have to retrieve fallen tools and repair damaged tools.

Even expensive pouches with hook and loop fasteners, zippers, and more are ineffective in storing the cordless tools safely. Operators may have to carry backpacks or other dedicated toolboxes which are not only expensive but are difficult to use and carry to a worksite. Also, currently, there is no means for operators to securely store the drills and impact driver tools in their clothing without fear of the tool falling out. People desire a novel device that helps in storing a drill or impact driver securely in a tool pouch and prevents the tool from falling out of a pouch while bending over, climbing a ladder, working on a roof, and more.

Therefore, there exists a long-felt need in the art for a support device for supporting and holding a cordless drill or impact tool. There is also a long-felt need in the art for a portable support device that cradles and supports the handle of a cordless tool. Additionally, there is a long-felt need in the art for a novel tool for holding a battery-operated drill or impact driver in a tool pouch. Moreover, there is a long-felt need in the art for a novel tool that enables a user to clip a cordless drill or impact tool to the belt for easy carriage and movement at a worksite. Furthermore, there is a long-felt need in the art for a cordless tool holding device that is designed to hold the tool securely by balancing the uneven weight distribution of the batteries of such tools. Also, there is a long-felt need in the art for a hooker tool that prevents a drill or any other similar tool from falling out of the tool pouch while bending over, climbing a ladder, working on a roof, and more. Finally, there is a long-felt need in the art for a specially designed C-shape device for supporting a cordless tool and improving workplace safety, eliminating the worry of a heavy tool falling from an elevated area.

The subject matter disclosed and claimed herein, in one embodiment thereof, comprises a cordless drill and impact driver holder device. The device is designed for securely holding a battery-operated drill or impact driver in a tool pouch. The device features an elongated handle having a bottom end and an opposite top end, wherein the handle is generally rectangular or rectilinear and adapted for firm gripping. A C-shaped holding member is integrated to the top end of the handle and is disposed at an angle that departs away from the longitudinal axis of the handle. An open part between the opposite ends of the C-shaped holding member is adapted to facilitate the insertion and removal of the handle of the drill or driver. The handle is secured by the device, thereby positioning the drill or tool in a generally horizontal position when the device is placed in the tool pouch. The device can be clipped on a belt using a belt clip disposed on the rear surface of the handle.

In this manner, the cordless drill and impact driver holder device of the present invention accomplishes all of the foregoing objectives and provides users with a device for holding a battery-operated drill or impact driver in a tool pouch. The C-shaped section cradles and secures the handle of a tool and holds the tool in place while the holder device is placed in a tool pouch, eliminating the tool from falling out of the tool pouch. An operator can bend over, climb ladders, and/or work in elevated areas without worry of the tool falling out from the pouch. The device can be clipped onto a belt for easy and secure accessibility of the accommodated too.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cordless drill and impact driver holder device. The device is designed for securely holding a battery-operated drill or impact driver in a tool pouch eliminating falling out of the drill or driver from the tool pouch. The device comprises a longitudinal ergonomic handle having a bottom end and an opposite top end, wherein the handle is generally rectangular or rectilinear and adapted for firm gripping. A C-shaped holding member is integrated to the top end of the handle and is disposed at an angle from about 10 degrees to about 30 degrees offset (i.e., departing) from the longitudinal axis 118 of the handle 102. An open part extends between the opposite ends of the C-shaped holding member and is adapted to facilitate the insertion and removal of the handle of the drill or driver, wherein the C-shaped holding member is sized to secure the handle of the drill tool.

In another aspect, a first surface of the handle displays a logo or indicia and a second surface of the handle has a removably attached belt clip and the handle has a length ranging from about 6.0 inches to about 15.0 inches and a width ranging from about 1.0 inches to about 4.0 inches.

In yet another embodiment, the inner surface of the C-shaped holding member includes a plurality of ridges for gripping a handle of a cordless drill or power tool.

In yet another embodiment, the belt clip is removably attached to the rear surface of the handle using at least one mechanical fastener which secures the belt clip to the handle. The belt clip includes a clipping member which is adapted to be pulled away from the handle to clip the holder tool on a belt or any clothing.

In a further embodiment, a cordless power tool holding device adapted to be placed in a tool pouch is disclosed. The device includes an elongated handle, and a Light Emitting Diode (LED) is disposed on the front surface of the handle and is configured to provide illumination to a work area. An adjustable C-shaped top member incorporating a sliding member is integrated to the top end of the handle, the sliding member enables the C-shaped top member to adjust an opening to accommodate different sizes and shapes of the drill or impact driver handles. A handle of a cordless tool is accommodated and secured by the C-shaped top member for providing support and stability of the cordless tool, wherein the tool holding device is placed in a pocket of a tool pouch for storing the cordless tool.

In yet another aspect of the present invention, for securing a drill or impact driver, the drill is inserted into the C-shape holding member through the open part such that the inner surface secures and cradles the handle of the drill.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
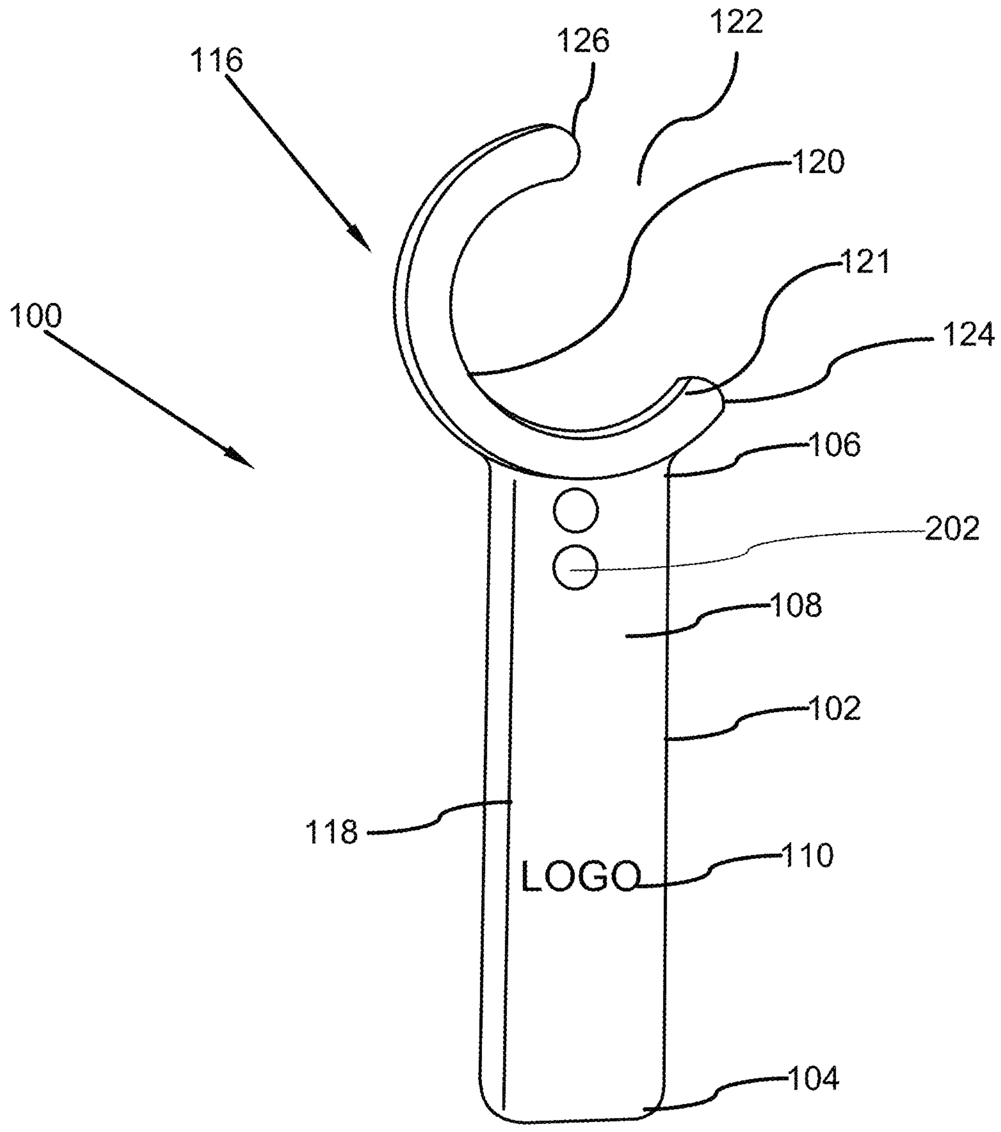
FIG. 1 illustrates a front perspective view of the cordless drill holder device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a support device for supporting and holding a cordless drill or impact tool. There is also a long-felt need in the art for a portable support device that cradles and supports the handle of a cordless tool. Additionally, there is a long-felt need in the art for a novel tool for holding a battery-operated drill or impact driver in a tool pouch. Moreover, there is a long-felt need in the art for a novel tool that enables a user to clip a cordless drill or impact tool to the belt for easy carriage and movement at a worksite. Furthermore, there is a long-felt need in the art for a cordless tool holding device that is designed to hold the tool securely by balancing the uneven weight distribution of the batteries of such tools. Also, there is a long-felt need in the art for a 'hooker' tool that prevents a drill or any other similar tool from falling out of the tool pouch while bending over, climbing a ladder, working on a roof, and more. Finally, there is a long-felt need in the art for a specially designed C-shape device for supporting a cordless tool and improving workplace safety, eliminating the worry of a heavy tool falling from an elevated area.

The present invention, in one exemplary embodiment, is a cordless power tool holding device adapted to be placed in a tool pouch for securely holding a cordless tool. The device includes an elongated handle and an adjustable C-shaped top member. A Light Emitting Diode (LED) is disposed on the front surface of the handle and is configured to provide illumination to a work area. An adjustable C-shaped top member incorporates a sliding member is integrated to the top end of the handle, the sliding member enables the C-shaped top member to adjust an opening to accommodate different sizes and shapes of the drill or impact driver handles. A handle of a cordless tool is accommodated and secured by the C-shaped top member for providing support and stability of the cordless tool, wherein the tool holding device is placed in a pocket of a tool pouch for storing the cordless tool.

Referring initially to the drawings, FIG. 1 illustrates a front perspective view of the cordless drill holder device of the present invention in accordance with the disclosed architecture. The cordless drill and impact driver holder device 100 of the present invention is designed to secure a battery-operated drill or impact driver within a tool pouch, enhancing both safety and convenience for users. More specifically, the holder device 100 is compact and portable and securely holds a tool, thereby preventing the tool from falling out of a tool pouch.

The holder tool 100 has a longitudinal ergonomic handle 102 having a bottom end 104 and an opposite top end 106. The handle 102 is generally rectangular or rectilinear and is used to firmly grip the holder tool 100. The first surface 108 of the handle 102 can have a logo or indicia 110 disposed thereon for branding and marketing purposes. The second surface 112 is opposite to the first surface 108 and has an attached belt clip 114 as illustrated in FIG. 2.

Figure 3:
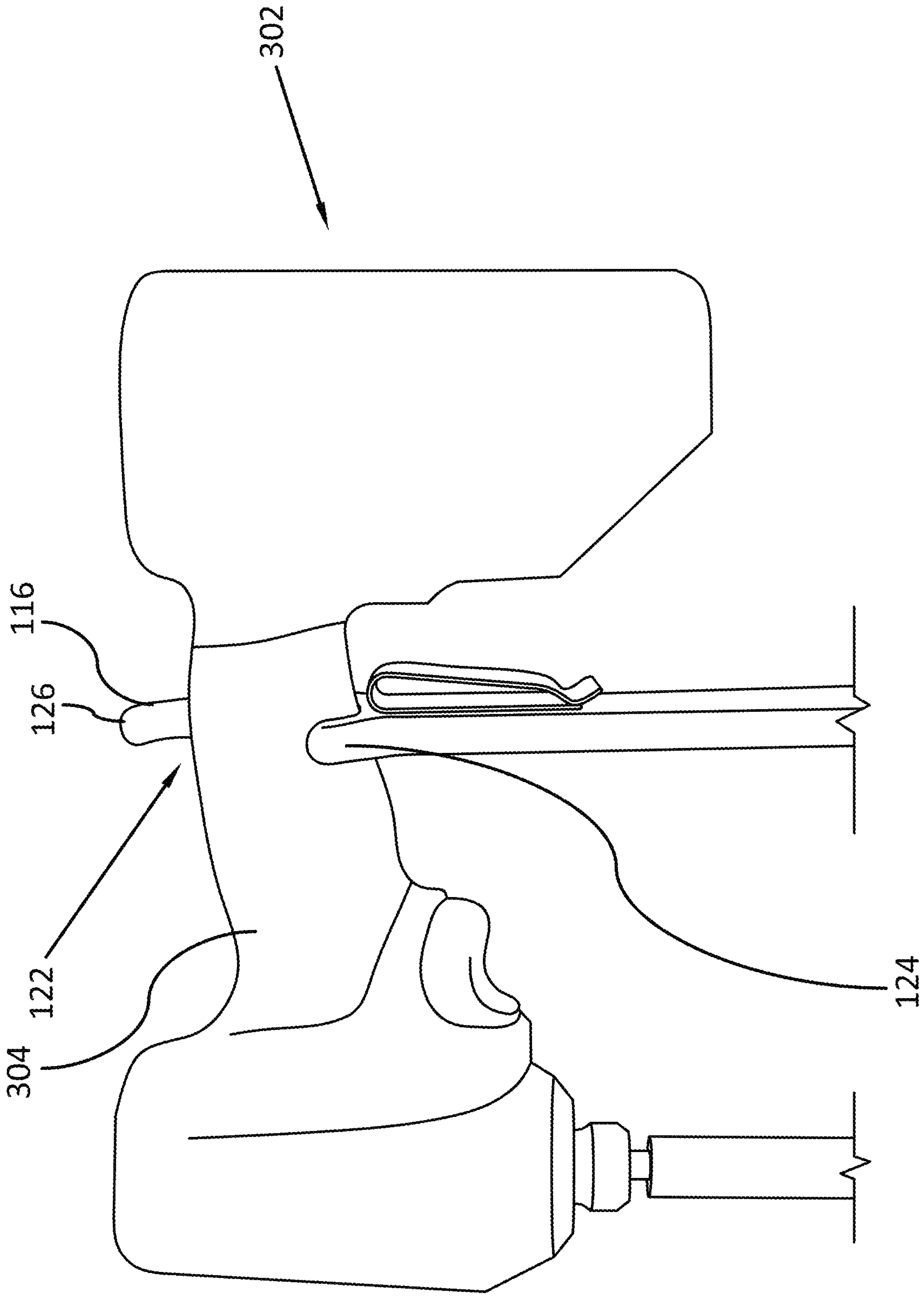
FIG. 3 illustrates a perspective view showing a cordless drill being supported by the cordless drill holder device of the present invention in accordance with one embodiment of the present invention.

A C-shape holding member 116 is integrated to the top end 106 of the handle 102 and the C-shape holding member 116 is disposed at an angle from about 10 degrees to about 30 degrees offset (i.e., departing) from the longitudinal axis 118 of the handle 102. The inner surface 120 of the C-shape holding member 116 has ridges 121 for strongly gripping the handle of a cordless drill or power tool as illustrated in FIG. 3. An open part 122 extends between the opposite ends 124, 126 of the C-shape holding member 116 and is for easy insertion and removal of the drill or driver for accommodation through the C-shape holding member 116. The C-shape holding member 116 can be designed to secure different types of cordless drills and impact tools.

The longitudinal ergonomic handle 102 can have a length from about 6.0 inches to about 15.0 inches and the width from about 1.0 inches to about 4.0 inches to meet the requirements of different users. The tool holder 100 can be made of weatherproof, durable, and insulating material including, but not limited to, PVC, vinyl, and other suitable materials.

Figure 2:
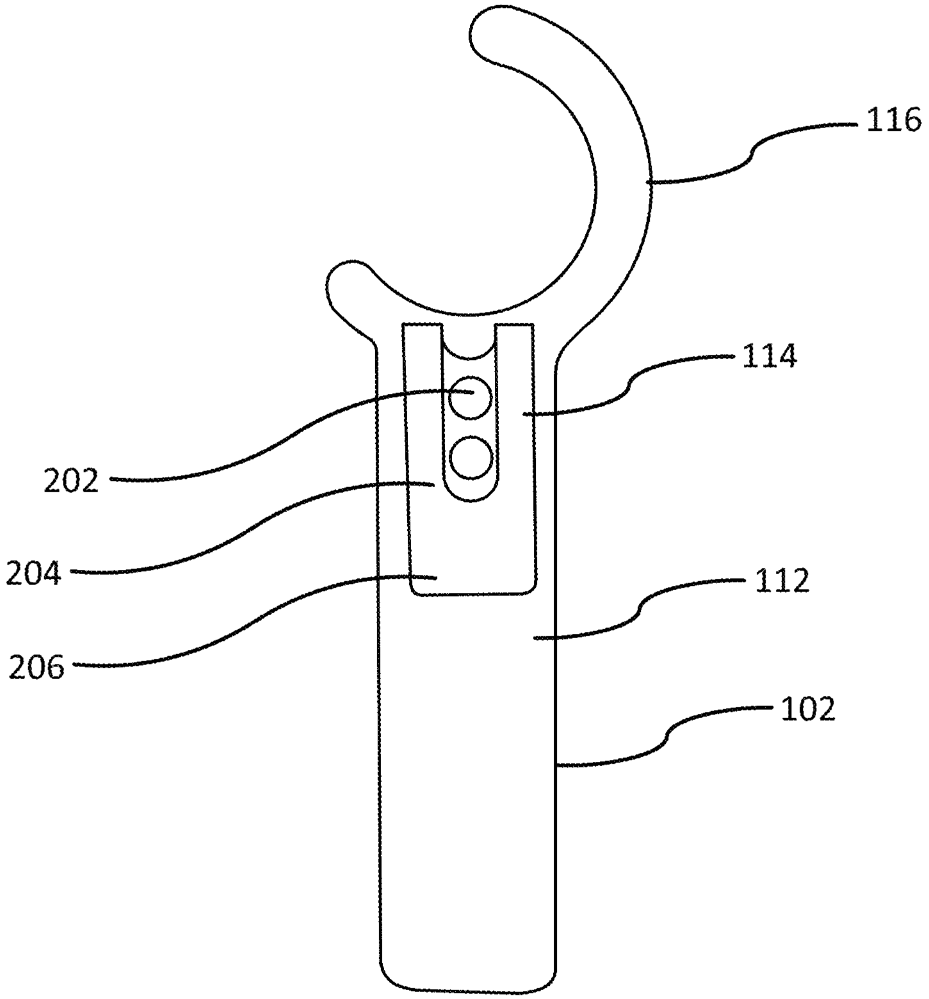
FIG. 2 illustrates a rear perspective view of the cordless drill holder device of the present invention in accordance with the disclosed architecture.

FIG. 2 illustrates a rear perspective view of the cordless drill holder device of the present invention in accordance with the disclosed architecture. A belt clip 114 is removably attached to the rear surface 112 of the handle 102 using at least one mechanical fastener 202 which secures the belt clip 114 to the handle 102. The mechanical fastener 202 is fastened across the handle 102 for a secure attachment with the handle 102.

The beveled bottom end 206 of a clipping member 204 of the belt clip 114 can be pulled away from the handle 102 to clip the holder tool 100 on a belt, a tool pouch, or any other clothing edge (i.e., waistband). In some embodiments, the belt clip 114 is adapted to rotate 360-degrees relative to the handle 102 for easier access and comfort, especially in tight spaces or when working at odd angles.

FIG. 3 illustrates a perspective view showing a cordless drill being supported by the cordless drill holder device of the present invention in accordance with one embodiment of the present invention. As illustrated, the drill 302 is inserted into the C-shape holding member 116 through the open part 122 such that the inner surface 120 secures and cradles the handle 304 of the drill 302. The C-shape holding member 116 prevents any unintentional lateral movement of the handle 304 of the drill 302, thereby providing support and stability.

Figure 4:
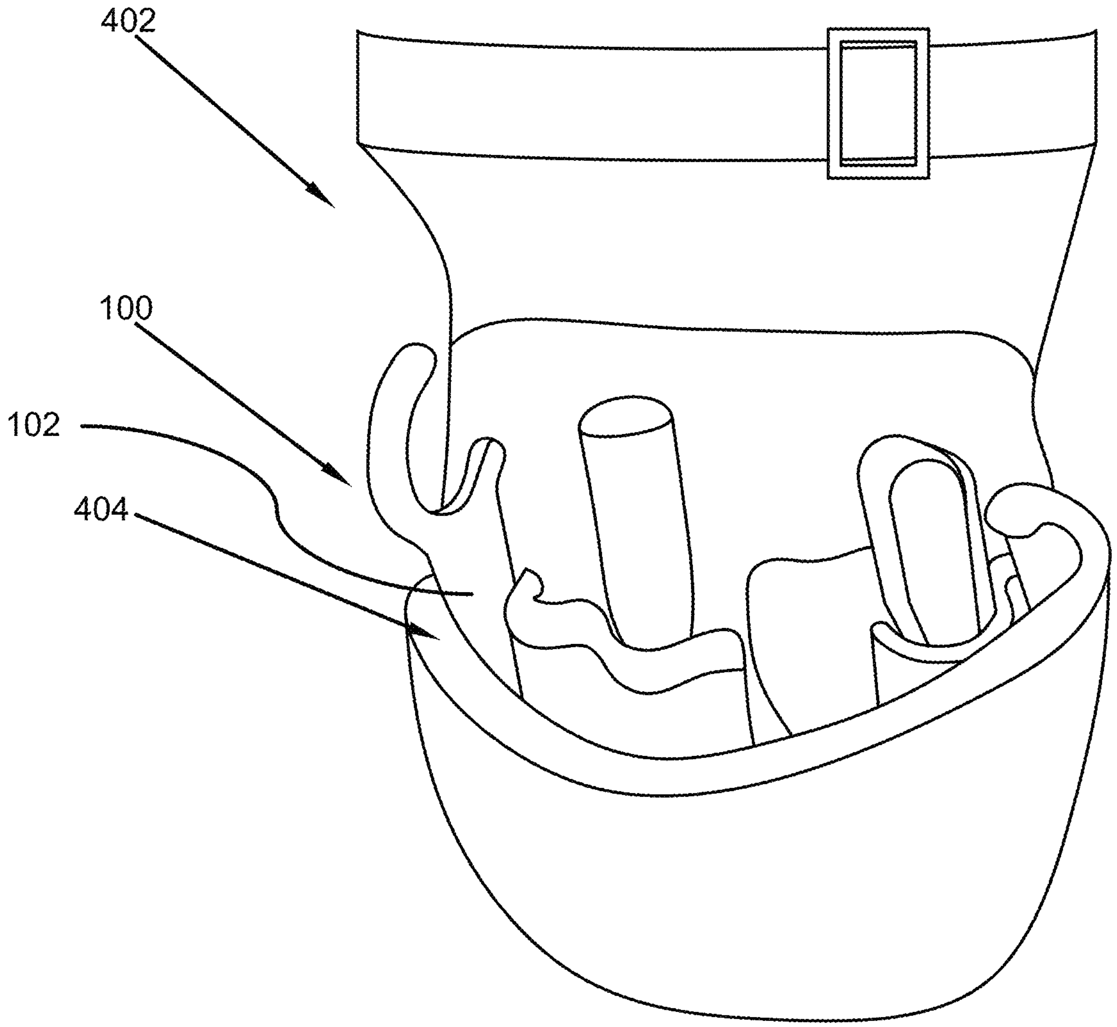
FIG. 4 illustrates a perspective view showing the drill and impact tool holder device of the present invention placed in a tool pouch for easy storage in accordance with the disclosed structure.

FIG. 4 illustrates a perspective view showing the drill and impact tool holder device of the present invention placed in a tool pouch for easy storage in accordance with the disclosed structure. The tool holder device 100 is compact, lightweight, durable, and can be placed in any pocket 404 of a tool pouch 402. The holder device 100 can be placed in any orientation and preferably with the C-shape holding member 116 at the top for easy access of a drill or impact tool.

Figure 5:
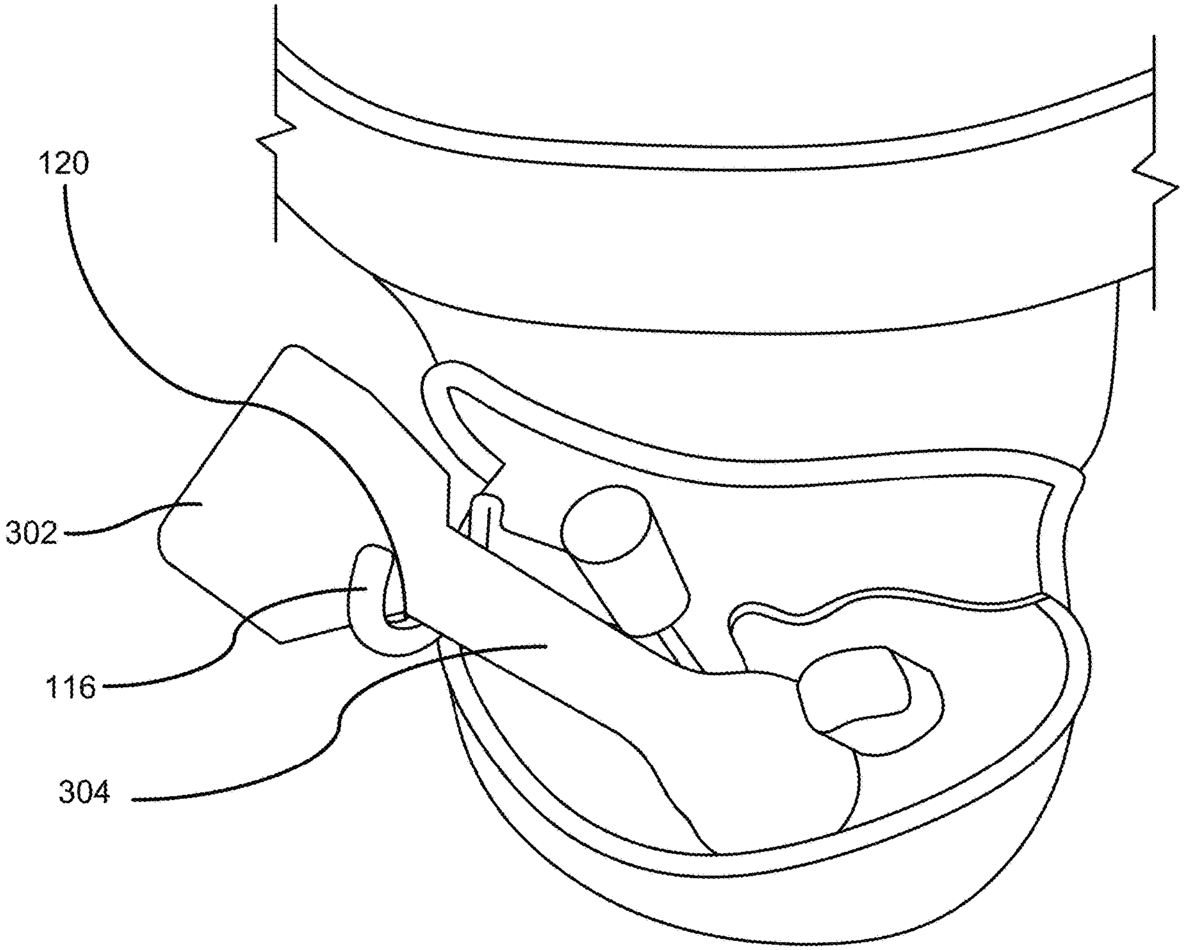
FIG. 5 illustrates a perspective view showing the tool holder device holding a cordless drill being placed in a tool pouch in accordance with one embodiment of the present invention.

FIG. 5 illustrates a perspective view showing the tool holder device holding a cordless drill being placed in a tool pouch in accordance with one embodiment of the present invention. The holder device 100 enables a user to place the drill or impact tool 302 in a substantially horizontal position, thereby providing stability when the tool 302 is placed in a pouch of the tool pouch 402. The C-shape holding member 116 secures the handle 304 of the drill 302 and does not fall out from the pocket.

Figure 6:
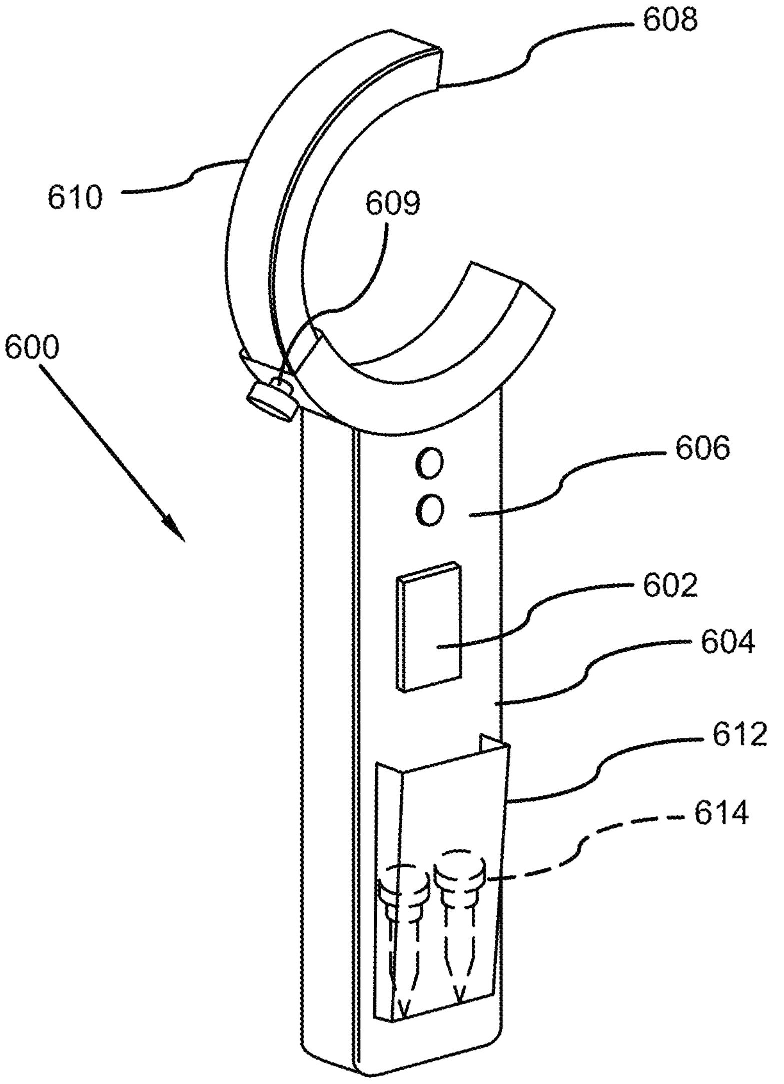
FIG. 6 illustrates another embodiment of the cordless tool holding device of the present invention in accordance with the disclosed structure.

FIG. 6 illustrates another embodiment of the cordless tool holding device of the present invention in accordance with the disclosed structure. In the present embodiment, the cordless tool holding device 600 includes an LED 602 disposed on the front surface 606 of the handle 604. The LED 602 provides illumination and can be directed to a work area and can be beneficial in low-light conditions, enabling an operator to see their work more clearly.

The C-shaped top member 608 is adjustable and includes a sliding member 610 enabling the C-shaped top member 608 to adjust an opening 611 and lock by a pin 609, thereby enabling the device 600 to accommodate different sizes and shapes of drill or impact driver handles. The handle 604 includes a storage space 612 for securely holding one or more bits or screws 614. Other specifications of the device 100 are the same as the holder device of other embodiments of the present invention.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "tool holder device", "holder device", "cordless drill and impact driver holder device", "cordless drill holder device", "cordless tool holding device", and "device" are interchangeable and refer to the cordless drill and impact driver holding device 100, 600 of the present invention.

Notwithstanding the foregoing, the cordless drill and impact driver holding device 100, 600 of the present invention can be of any suitable size and configuration as is known in the art without affecting the overall concept of the invention, provided that it accomplishes the above-stated objectives. One of ordinary skill in the art will appreciate that the cordless drill and impact driver holding device 100, 600 as shown in the FIGS. are for illustrative purposes only, and that many other sizes and shapes of the cordless drill and impact driver holding device 100, 600 are well within the scope of the present disclosure. Although the dimensions of the cordless drill and impact driver holding device 100, 600 are important design parameters for user convenience, the cordless drill and impact driver holding device 100, 600 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cordless driver holder device comprising:

a tool holder having a longitudinal handle including a bottom end and an opposing top end, a C-shaped holding member, and a belt clip for securing a cordless driver within a tool pouch;

wherein said C-shaped holding member integrated to said top end of said longitudinal handle;

wherein said C-shaped holding member having a lockable sliding member for adjusting an opening in said C-shaped holding member to accommodate insertion and removal of different sizes of handles of a cordless driver; and further wherein said belt clip clipped to an edge of the tool pouch with said C-shaped holding member oriented upwards from the tool pouch.

2. The cordless driver holder device of claim 1, wherein an inner surface of said C-shaped holding member having a plurality of ridges for gripping the handle of the cordless driver.

3. The cordless driver holder device of claim 1, wherein said belt clip attached to a side of said longitudinal handle proximal to said C-shaped holding member.

4. The cordless driver holder device of claim 1, wherein said longitudinal handle having an LED light.

* * * * *